United States Patent [19]

Masuko

[11] Patent Number: 4,742,545
[45] Date of Patent: May 3, 1988

[54] VIDEO PICTURE SIGNAL SCRAMBLING SYSTEM

[75] Inventor: Akinori Masuko, Fukaya, Japan

[73] Assignee: Kabushiki Kaisha Toshiba, Kawasaki, Japan

[21] Appl. No.: 913,387

[22] Filed: Sep. 30, 1986

[30] Foreign Application Priority Data

Sep. 30, 1985 [JP] Japan .................................. 60-214959

[51] Int. Cl.⁴ ............................................. H04N 7/167
[52] U.S. Cl. ........................................... 380/17; 380/10
[58] Field of Search ...................................... 380/17, 10

[56] References Cited

U.S. PATENT DOCUMENTS 4,308,556 12/1981 Osaka .
4,340,906 7/1982 den Toonder et al. .
4,429,331 1/1984 Kanai ..................................... 380/17
4,599,648 7/1986 Fujii et al. .............................. 380/17

FOREIGN PATENT DOCUMENTS 0841627 7/1960 United Kingdom .................. 380/17

Primary Examiner—Stephen C. Buczinski
Attorney, Agent, or Firm—Oblon, Fisher, Spivak, McClelland & Maier

[57] ABSTRACT

A video picture signal scrambling system for subscription braodcast or cablecast television systems which can scramble video signals without adversely effecting pictures received at a subscriber's terminal. The system includes a detector for detecting the brightness level of the picture signal over a predetermined interval, a comparator for comparing the brightness level with a first predetermined reference value and a scrambling circuit responsive to the comparator for inhibiting reversion of the picture signal when the brightness level exceeds the first reference value, and for selectively reversing the picture signal in response to changes in the brightness level in successive intervals of the picture signal.

46 Claims, 5 Drawing Sheets

VIDEO PICTURE SIGNAL SCRAMBLING SYSTEM

BACKGROUND OF THE INVENTION

1. Field of the Invention

The present invention relates to a video signal scrambling system and, more particularly, to a video signal scrambling system for subscription broadcast or cablecast television systems which can scramble video signals without adversely effecting pictures received at a subscriber's terminal.

2. Description of the Prior Art

In a broadcast television (TV) or cablecast television (CATV) system, a subscription television system or a pay program system has been developing, in which a subscriber subscribes to a broadcast or cablecast station (hereafter referred as TV station) for a reception of programs. In the pay program system, a program is scrambled at the TV station and is transmitted to a subscriber's terminal. A descramble circuit is provided in the subscriber's terminal.

In the TV or CATV system based on the pay program system, it is necessary to scramble pay program signals in order to prohibit non-subscribers from receiving and enjoying the pay program. In this case, a key data to descramble the scrambled pay program is used in the subscriber's terminal.

In addition, it is necessary to prevent the pay programs received at the subscriber's terminal from being adversely effected by the scrambling operation.

An example of conventional video picture signal scrambling systems is described in this U.S. Pat. No. 4,308,556 issued on Dec. 29, 1981. In the scrambling system, programs are scrambled by reversing the brightness level of a video picture signal on a horizontal cycle when the average brightness level of the picture signal changes. In this system, a reversion of the picture signal is performed only when the average brightness level of the pictures has changed by a predetermined amount. Then, the scrambled program is transmitted to the subscriber's terminal, together with key data showing the locations of the level reversed pictures. The level reversed picture is then restored in the subscriber's terminal according to the key data.

In the conventional video picture signal scrambling system, flicker of the picture presented on a display, e.g., a cathode ray tube, is reduced to some degree. However, often the restoration of the level reversed picture takes place with reference to another level, different from the predetermined level used at the TV station. In that case, the brightness of the restored picture shifts from the brightness of previous and subsequent pictures. Thus, the flicker becomes more pronounced. Therefore, the conventional system still has a drawback in that the flicker is not sufficiently suppressed.

The conventional video picture signal scrambling system also has another drawback in that the channel of a scrambled program causes a cross modulation distortion to other channels. As well known, every channel causes the cross modulation distortion to other channels, in proportion to the square of the amplitude of its carrier wave. In the conventional video picture signal scrambling system, the carrier wave of the scrambled program channel can easily become excessively modualted in amplitude by the level reversed picture signal.

SUMMARY OF THE INVENTION

Accordingly, an object of the present invention is to provide a video signal scrambling system which is able to scramble programs without causing a flicker of a picture at a subscriber's terminal.

Another object of the present invention is to provide a video signal scrambling system with a secure scrambling performance that prohibits program reception by non-subscribers.

A further object of the present invention is to provide a video signal scrambling system which exhibits improved cross modulation distortion with respect to other channels.

In order to achieve the above objects, the video signal scrambling system according to the present invention includes a detector for detecting the brightness level of the picture signal over a predetermined interval, a comparator for comparing the brightness level with a first predetermined reference value and a scrambling circuit responsive to the comparator for inhibiting reversion of the picture signal when the brightness level exceeds the first reference value, and for selectively reversing the picture signal in response to changes in the brightness level in successive intervals of the picture signal.

DESCRIPTION OF THE PREFERRED EMBODIMENTS

Figure 1:
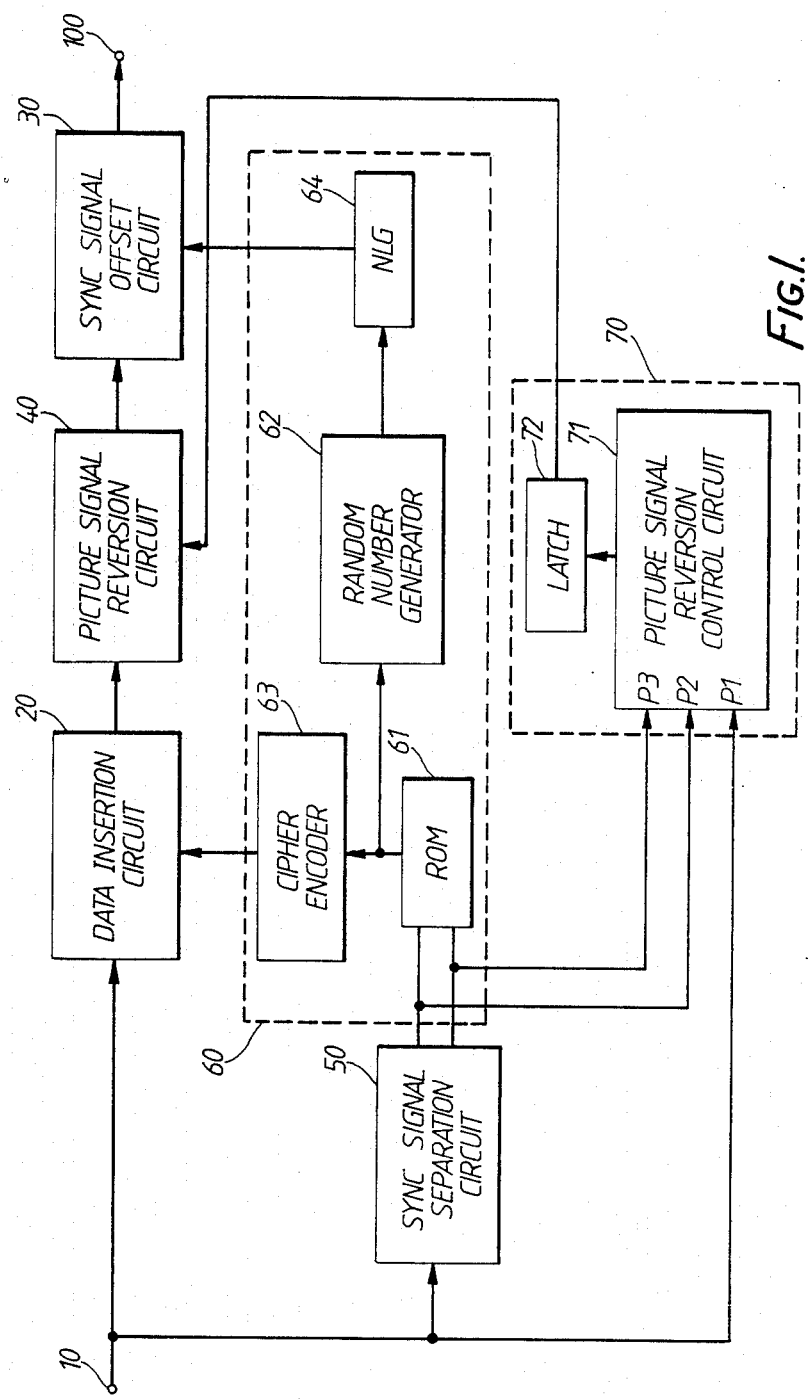
FIG. 1 is a block diagram showing an embodiment of the video signal scrambling system according to the present invention.

The present invention will now be described in detail with reference to the accompanying drawings, namely, FIGS. 1 to 5. Throughout the drawings, like reference numerals and letters are used to designate like or equivalent elements for the sake of simplicity of explanation.

Referring now to FIG. 1, an embodiment of the video signal scrambling system according to the present invention will be described in detail. FIG. 1 shows a circuit diagram of an encoder used for scrambling programs in a TV station, according to the present invention. In this circuit, assume that the average brightness level of the picture signal in the video signal is discriminated, the level of picture signals during continuous horizontal scan periods is changed more than a fixed level, and reversion control of the picture signals is performed.

That is, the possibility of reversion control of picture signals is determined according to the average brightness level of the picture signals and reversion of picture signals other than those having an average brightness level at a fixed level are forcibly performed or inhibited.

In performing the video signal scrambling by picture level reversion, flicker of the scrambled pictures on the subscriber's terminal is controlled and the secrecy of the scrambled programs can be improved by controlling the reference level used to restore the scrambled video picture signal.

In FIG. 1, picture signals to be scrambled are applied to an input terminal 10. The picture signals on input terminal 10 are transmitted to an output terminal 100 of the encoder through a data insertion circuit 20, a picture signal reversion circuit 40 and a synch signal offset circuit 30. Data insertion circuit 20 inserts data necessary for the pay program system onto the picture signal. Picture signal reversion circuit 40 reverses the picture signal as described in detail later. The synch signal offset circuit 30 offsets or shifts the level of a horizontal synch signal.

The data is inserted on a portion, for example, the vertical retrace line interval of the horizontal line period of the picture signal. Circuit 30 is used for offsetting the synch signal in the scrambling system. Together with the picture signal reversion, this increases the secrecy of pay programs, and makes decoding by non-subscribers more difficult.

The picture signal is applied also to a sync signal separation circuit 50 where horizontal sync signals and vertical sync signals are separated from the video signal. The horizontal sync signals and vertical sync signals are used as clock signals for controlling a data generation circuit 60 and a picture signal reversion control circuit 70.

Data generation circuit 60 includes a ROM 61, a cipher encoder 63, a random number generator 62 and a non-linear gate (NLG) 64. Predetermined data is read out from ROM 61, based on the clock of the horizontal sync signals and the vertical sync signals applied from sync signal separation circuit 50. The data supplied from ROM 61 is coded to a cipher in cipher encoder 63. The cipher applied from cipher encoder 63 is applied to data insertion circuit 20 as key data. Subscribers are able to access this key data for descrambling the pay program, i.e., the scrambled program. The data supplied from ROM 61 is also applied for initializing random number generator 62. Random number generator 62 generates random numbers of a given sequence, initialized by the ROM data. These random numbers are encoded further in a non-linear gate (NLG) 64 for increasing the secrecy, and are applied to sync signal offset circuit 30. Sync signal offset circuit 30, then, offsets or shifts the level of the horizontal sync signals in the picture signals at the timing specified by the encoded random numbers described above.

Picture signal reversion control circuit 70 includes a control signal generating circuit 71 and a switch circuit 72. Control signal generating circuit 71 generates control signals for controlling the picture signal reversion in picture signal reversion circuit 40 in accordance with the average brightness level of the picture signal. Switch circuit 72 controls the application of the control signals generated by control signal generating circuit 71 to picture signal reversion circuit 40. The output of switch circuit 72 is used as a control signal for controlling picture signal reversion circuit 40 whether or not the picture signals are reversed.

Picture signal reversion control circuit 70 detects the average brightness level of the picture signal as well as the degree of change of the average brightness level of the picture signal for successive intervals. Picture signal reversion control circuit 70 determines whether or not the picture signal reversion should be performed for scrambling the program by the detection of the average brightness level and the degree of change of the average brightness level. As a result, conspicuous flicker on video pictures presented at the subscriber's terminal, is reduced. In addition, the operation for inhibiting the picture reversion is performed without regard to changes in the average brightness levels so long as the average brightness level is maintained below the first predetermined level, e.g., 10 IRE. As a result, the picture signal below 10 IRE in the average brightness level is forcibly left unreversed for reducing the flicker. Because if the picture signal below 10 IRE in the average brightness level is reversed by the scrambling, the reversed picture signal has the average brightness level over 90 IRE. The reversed picture signal with the average brightness level over 90 IRE would cause conspicuous flicker on video pictures presented at the subscriber's terminal. When a horizontal sync signal offset scrambling is used together with the video picture scrambling, the level of the horizontal sync signal is offset or shifted to around 50 IRE by the sync signal offset scrambling. In this case, the picture signal below 10 IRE in the average brightness level, which is left unreversed by the inhibition of the reversion, operates as a counterfeit horizontal sync signal. This counterfeit horizontal sync signal is detected in place of the genuine horizontal sync signal offset. The synchronization in the non-subscriber's terminal is then disturbed by the picture signal below 10 IRE in the average brightness level, which is left unreversed. So that, this increases the secrecy of the pay programs, and makes decoding by the non-subscribers more difficult.

On the other hand, the picture signal reversion is forcibly performed without regard to changes in the average brightness levels so long as the average brightness level is maintained above a second predetermined level, e.g., 90 IRE. As a result, the picture signal above 90 IRE in the average brightness level is forcibly reversed for also reducing the flicker. Because when the picture signal above 90 IRE in the average brightness level is reversed, the reversed picture signal has the average brightness level below 10 IRE. The reversed picture signal with the average brightness level below 10 IRE hardly causes conspicuous flicker on video pictures presented at the subscriber's terminal. In addition, when the horizontal sync signal offset scrambling is used together with the video picture scrambling in similar to the above case, the reversed picture signal below 10 IRE in the average brightness level also operates as the counterfeit horizontal sync signal. So that, this forcibly reversed picture signal increases the secrecy of the pay programs, and makes decoding by the non-subscribers more difficult.

As described above, the picture signal reversion is inhibited to the video picture signals lower than 10 IRE in the average brightness level, in which flicker is conspicuous on the pictures presented at the subscriber's terminal. While the picture signal reversion is forcibly performed to the video picture signals higher than 90 IRE in the average brightness level, in which flicker is inconspicuous on the picture presented on a display of the subscriber's terminal.

The picture signal of the average brightness level from 10 IRE to 90 IRE is detected the change or the level shift of the average brightness level during successive horizontal scan intervals as described above. When the change of the average brightness level exceeds a predetermined value, e.g., 20 IRE is detected, the reversion of the video picture signal is performed for the scrambling. So that conspicuous flicker on the subscriber's terminal is reduced.

Figure 2:
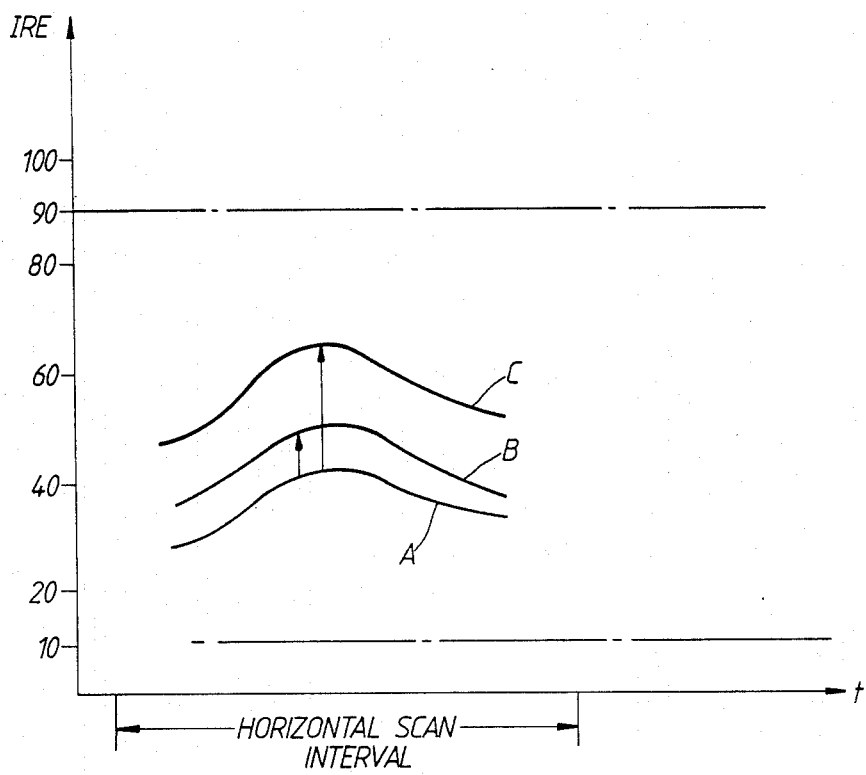
FIG. 2 is a graph for explaining the embodiment of the video signal scrambling system of FIG. 1.

As shown in FIG. 2, when the average brightness level of the previous picture signal at the nth (n represents a positive integer) horizontal scan interval is around 40 IRE (see Graph A in FIG. 2) and the average brightness level of the subsequent picture signal at the "n+1"th horizontal scan interval is around 50 IRE (see Graph B in FIG. 2), the subsequent picture signal is left unreversed. Because the level change is below the predetermined value, i.e., 20 IRE. On the other hand, when the average brightness level of the previous picture signal at the nth horizontal scan interval is around 40 IRE (Graph A in FIG. 2) and the average brightness level of the subsequent picture signal at the "n+1"th horizontal scan interval is around 65 IRE (see Graph C in FIG. 2), the subsequent picture signal is reversed. Because the level change is above the predetermined value, 20 IRE.

As described above, in the embodiment shown in FIG. 1, it is discriminated that which range of the three ranges, that is, a low level range of under 10 IRE, or a high level range of over 90 IRE, or further an intermediate level range from 10 IRE to 90 IRE the picture signal is at present. And proper operations are performed for the picture signals, according to these three level ranges, respectively.

Figure 3:
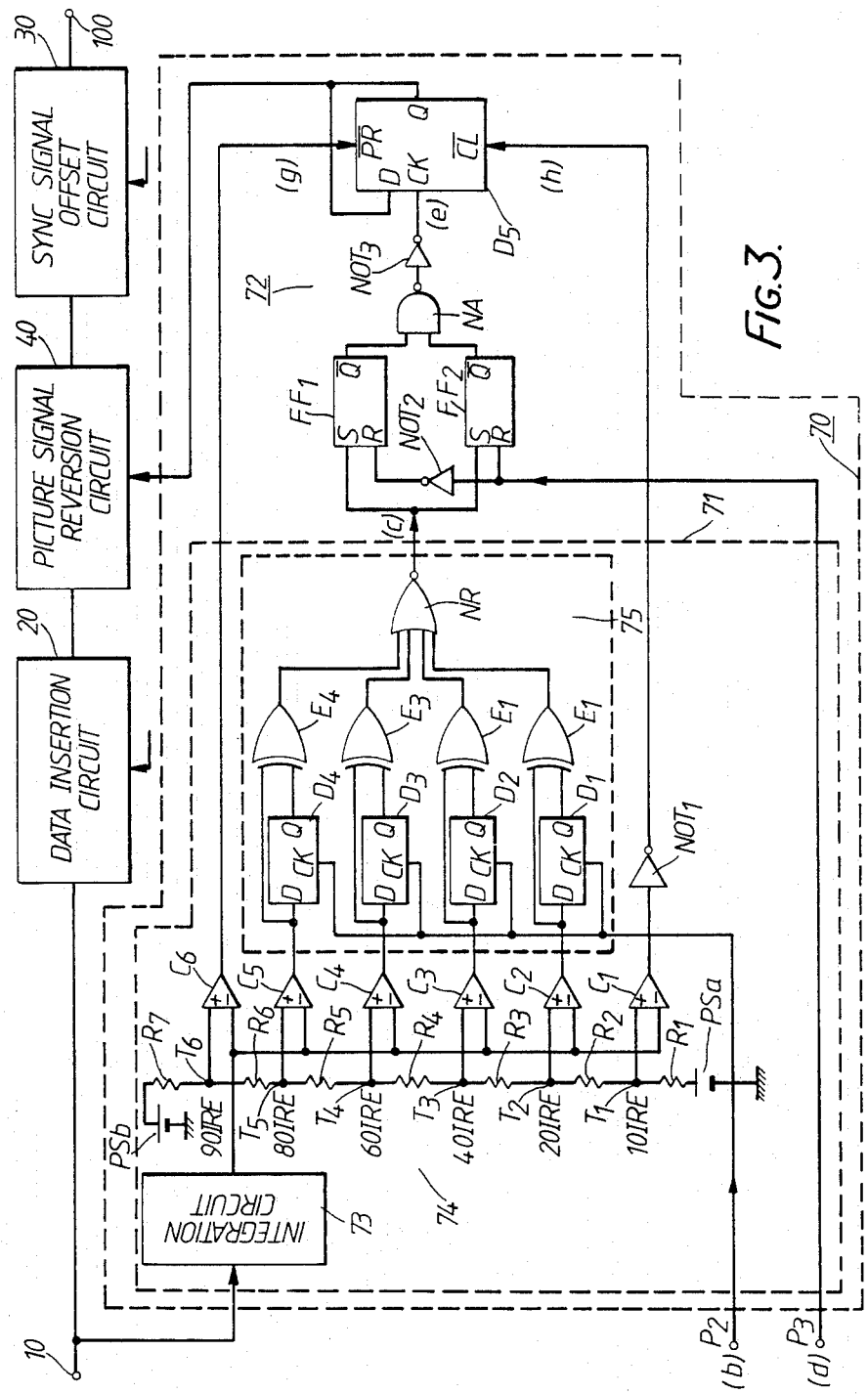
FIG. 3 is a block diagram showing an embodiment of the picture level reversion control circuit of FIG. 1.

In such a manner as described above, the selection of the operations is performed by picture signal reversion control circuit 70. FIG. 3 is a circuit diagram showing the detail of picture signal reversion control circuit 70 of FIG. 1 for performing the selection of the operations corresponding to the three level ranges according to the present invention.

In the drawing, picture signals to be scrambled are supplied to an integration circuit 73 of control signal generating circuit 71 through a picture signal input terminal P1. Integration circuit 73 integrates the brightness level of the picture signal in every horizontal scan interval and produces the average brightness level signal a. Average brightness level signal a is applied to one input terminals, e.g., inverted input terminals of first to sixth comparators C1 to C6, respectively. Other input terminals, i.e., non-inversed input terminals of comparators C1 to C6 are applied individual reference potentials, respectively. These reference potentials are supplied from a potential divider circuit 74 connected between potential sources PSa and PSB, which supply DC potentials corresponding, respectively, to 0 IRE and 100 IRE. Potential divider circuit 74 is comprised of a series of resistors R1, R2, . . . , and R7. A first connection node T1 of resistors R1 and R2 supplies the potential of 10 IRE to the non-inverse input terminal of first comparator C1. A second connection node T2 of resistors R2 and R3 supplies the potential of 20 IRE to the non-inverse input terminal of second comparator C2. A third connection node T3 of resistors R3 and R4 supplies the potential of 40 IRE to the non-inverse input terminal of third comparator C3. A fourth connection node T4 of resistors R4 and 54 supplies the potential of 60 IRE to the non-inverse input terminal of fourth comparator C4. A fifth connection node T5 of resistors R5 and R6 supplies the potential of 80 IRE to the non-inverse input terminal of fifth comparator C5. A sixth connection node T6 of resistors R6 and R7 supplies the potential of 90 IRE to the non-inverse input terminal of sixth comparator C6.

First comparator C1 detects if average brightness level signal a applied from integration circuit 73 is under 10 IRE. In other words, first comparator C1 detects if the average brightness level signal a is in the low level range from 0 IRE to 10 IRE. Sixth comparator C6 detects if average brightness level signal a is over 90 IRE. In other words, sixth comparator C6 detects if average brightness level signal a is in the high level range from over 10 IRE to 100 IRE. Also, second to fifth comparators C2 to C5 detect if average brightness level signal a is over 10 IRE, 20, IRE, 40 IRE, 60 IRE or 80 IRE, respectively, in the intermediate level range from over 10 IRE to 90 IRE.

The output terminal of first comparator C1 is coupled to switch circuit 72 through a first inverter or NOT gate NOT1. While, the output terminal of sixth comparator C6 is is coupled to switch circuit 72 directly. The output terminals of second to fifth comparators C2 to C5 are coupled to a level change detection circuit 75. Level change detection circuit 75 includes first to fourth D-type flip-flops (D-FF) D1 to D4, first to fourth exclusive-OR (EX-OR) gates E1 to E4 and an NOR gate NR. The output terminals of second to fifth comparators C2 to C5 are connected to both data input terminals D of first to fourth D-FFs D1 to D4 and one input terminals of first to fourth EX-OR gates E1 to E4, respectively. Output terminals Q of first to fourth D-FFs D1 to D4 are connected to other input terminals of first to fourth EX-OR gates E1 to E4, respectively. The output terminals of first to fourth EX-OR gates E1 to E4 are connected to respective input terminals of NOR gate NR. On the other hand, a first clock signal, e.g., a horizontal sync signal b is applied to clock input terminals CK of first to fourth D-FFs D1 to D4 through a first clock signal input terminal P2. The output terminal of NOR gate NR is coupled to switch circuit 72.

Switch circuit 72 includes first and second reset-set flip-flops (RS-FF) FF1 and FF2, an NAND gate NA, a fifth D-FF D5 and second and third inverters NOT2 and NOT3. The output terminal of NOR gate NR is connected to set terminals S of first and second RS-FFs FF1 and FF2. While, a second clock signal, e.g., a vertical sync signal d is applied to reset terminals R of first and second RS-FFs FF1 and FF2 through a second clock signal input terminal P3. Inverted output terminals Q of first and second RS-FFs FF1 and FF2 are connected to two input terminals of NAND gate NA, respectively. The output terminal of NAND gate NA is connected to clock terminal CK of fifth D-FF D5 through third inverter NOT3. In addition, the outputs of first inverter NOT1 and sixth comparator C6 are applied to the inverter clear terminal CL and the inverted preset terminal PR of fifth D-FF D5, respectively. The output terminal Q of fifth D-FF D5 is connected to the data input terminal D of fifth D-FF D5 itself and further connected to picture signal reversion circuit 40.

Figure 4:
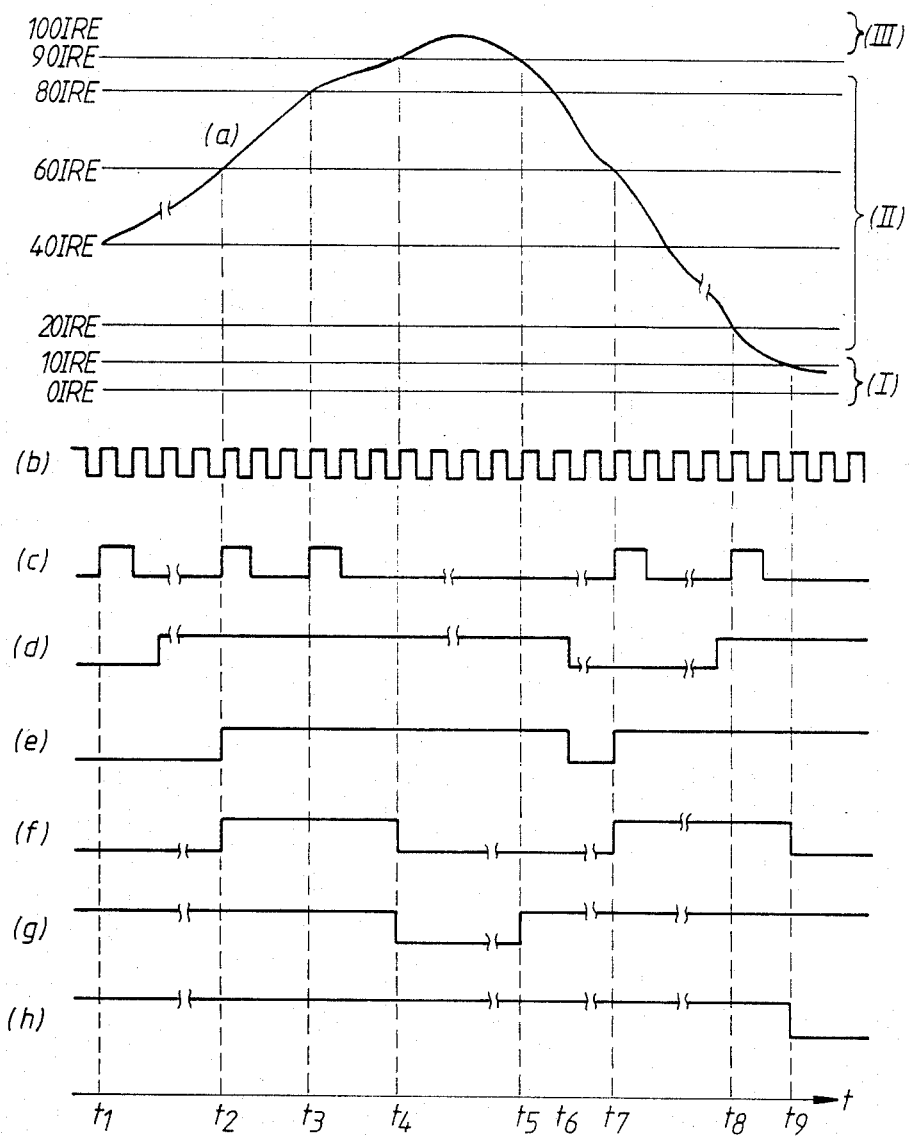
FIG. 4 shows timing charts for explaining the operation of the embodiment of the picture level reversion control circuit of FIG. 3.

Referring now to FIG. 4, the timing chart of each part shown in FIG. 4, the operation of reversion control circuit 70 shown in FIG. 3 will be described in detail hereafter. In FIG. 4, Graph (a) shows the change of average brightness level signal a which is the output of integration circuit 73. Graph (b) in the drawing shows first clock signal b applied to first to fourth D-FFs D1 to D4 connected respectively to comparators C2 to C5 in FIG. 3. First clock signal b is a signal having relatively a short period or a high frequency, e.g., the horizontal sync signal obtained from sync signal separation circuit 50 (see FIG. 1). But, first clock signal b may have another clock frequency so that first clock signal b may not be limited to the horizontal sync signal.

When it is detected by sixth comparator C6 that average brightness level signal a is over 90 IRE (time interval: t4 - t5), a comparison output g of sixth comparator C6 becomes low (referred as "L" hereafter) level during the interval from t4 to t5 as shown in Graph (g) in the timing chart. "L" level comparison output g is applied to inverted preset terminal PR of fifth D-FF D5. Output f of fifth D-FF D5 becomes "L" level as shown in Graph (f) during the time interval, and the picture signal reversion is performed by the picture signal reversion circuit 40. In other words, when average brightness level signal a of over 90 IRE is in level range III in FIG. 4 of the high level range, the picture signal reversion is forcibly performed.

Next, when average brightness level signal a produced from integration circuit 73 is below 10 IRE (time interval: after t9), i.e., in level range I or the low level range, the comparison output of first comparator C1 becomes high (referred as "H" hereafter) level. But the comparison output is inverted to "L" level by first inverter NOT1 (see Graph (h). "L" level comparison output h of first inverter NOT1 is applied to inverted clear terminal CL of fifth D-FF D5. Output f of fifth D-FF D5 then becomes to "H" level. As a result, when average brightness level signal a is below 10 IRE, the picture signal reversion by picture signal reversion circuit 40 is inhibited.

When average brightness level signal a is above 10 IRE but below 90 IRE, i.e., in level range II or the intermediate level range, the level change of average brightness level signal a of every 20 IRE is detected by any of second to fifth comparators C2 to C5. In other words, every when average brightness level signal a becomes higher or lower than 20 IRE, 40 IRE, 60 IRE and 80 IRE, the second to fifth corresponding comparators C2 to C5 changes their logic output level in turn. Each output of the second to fifth comparators C2 to C5 is applied to level change detection circuit 75. In level change detection circuit 75, the change of the logic output level of any of second to fifth comparator C2 to C5 is latched by a proper one of first to fourth D-FFs D1 to D4. For example, the logic output level of second comparator C2 is latched by first D-FF D1 at a timing of the leading end of first clock signal b supplied from first clock signal input terminal P2. Second clock signal d is a signal having relatively a long period or a low frequency, e.g., the vertical sync signal obtained from sync signal separation circuit 50 (see FIG. 1). But, second clock signal d may have another clock frequency so that second clock signal d may not be limited to the vertical sync signal.

The output of first D-FF D1 is applied to to one input terminal of first EX-OR E1, while the comparison output of second comparator C2 is applied to the other input terminal of first EX-OR E1. Accordingly, first EX-OR E1 takes an exclusive-OR logic between the subsequent comparison output applied from second comparator C2 and the previous comparison output applied from first D-FF D1. Accordingly, when average brightness level signal a increases over or decreases under the reference potential 20 IRE on second connection nod T2, first EX-OR E1 outputs a pulse lasting one cycle of first clock signal b (an inverted form of signal shown in Graph (c)) (time: t8). Other EX-ORs E2 to E4 also output such pulse every when average brightness level signal a increases over or decreases under the reference potential 40 IRE on third connection nod T3, the reference potential 60 IRE on fourth connection nod T4 and the reference potential 80 IRE on fourth connection nod T4 (times: t1, t2 and t3). The pulse obtained by EX-ORs E1 to E4, i.e., the output of level change detection circuit 75 is inverted to signal c as shown in Graph (c) through NOR gate NR and applied to switch circuit 72. In switch circuit 72, signal c is applied to set terminals S of first and second RS-FFs FF1 and FF2. Inverted output terminals Q of first and second RS-FFs FF1 and FF2 are connected to third inverter NOT3 through NAND gate NA as described before. Accordingly, an output e of third inverter NOT3 takes "H" level when "H" level pulse c is applied to switch circuit 72 during second clock signal d, e.g., the vertical sync signal is "H" level. Second clock signal d is applied through second clock signal input terminal P3 to reset terminals R of first and second RS-FFs FF1 and FF2 directly or through second inverter NOT2, as described before. For example, when second clock signal d has changed to "H" level between times t1 and t2, output e of third inverter NOT3 changes to "H" level at time t2 that "H" level pulse c is obtained on the output terminal of level change detection circuit 75 (see Graph (e)). Output e of third inverter NOT3 maintains "H" level till second clock signal d changes to "L" level at a time t6, in spite of that another pulse c occures on the output terminal of NAND gate NA, e.g., at time t3. Because first and second RS-FFs FF1 and FF2 are reset complementarily by "H" level second clock signal d.

Output e of third inverter NOT3 is applied to clock terminal CK of fifth D-FF D5. Fifth D-FF D5 ought to maintain "H" level output between times t2 to t6, according to its "H" level clock input signal, i.e., "H" level signal e. However, during times t4 to t5 that average brightness level signal a exceeds 90 IRE, the inverted preset input signal of fifth D-FF D5, i.e., comparison output g of sixth comparator C6 takes "L" level. So that, output f of fifth D-FF D5 is forcibly changed to "L" level during times t4 to t5. After time t5, comparison output g of sixth comparator C6 restores to "H" level at time t5 that average brightness level signal a dereases under 90 IRE. However, the clock input, i.e., output e of third inverter NOT3 is left unchanged in "H" level till time t6. So that, output f of sixth D-FF D5 still keeps "L" level between times t5 to t6 as well as times t6 to t7 that output e of third inverter NOT3 is restored to "L" level.

Output e of third inverter NOT3 again changes to "H" level at time t7 when average brightness level signal a changes by over 20 IRE, i.e., the amount from 80 IRE at time t3 to 60 IRE at time t7. Therefore, output f of fifth D-FF D5 becomes "H" level at that time. "H" level output f of fifth D-FF D5 is also maintained till time t9, in spite of that another pulse c occures on the output terminal of NAND gate NA, e.g., at time t8. That is, first and second RS-FFs FF1 and FF2 are reset complementarily by "H" level clock signal d at time t8.

Output e of third inverter NOT3 is applied to clock terminal CK of fifth D-FF D5. Fifth D-FF D5 ought to maintain "H" level for its output f between times t6 to t9 and also after time t9 according to its "H" level clock input signal, i.e., "H" level signal e. However, after time t9 that average brightness level signal a decreases under 10 IRE, the inverted clear input signal of fifth D-FF D5, i.e., output h of first inverter NOT1, which is the inverted signal of the comparison output of first comparator C1, takes "L" level. So that, output f of fifth D-FF D5 is forcibly changed to "L" level after time t9. After time t9, if inverted clear input signal h would restore to "H" level and the clock input, i.e., output e of third inverter NOT3 were left unchanged in "H" level, output f of sixth D-FF D5 still keeps "L" level. So that, the picture signal applied from input terminal 10 (see FIG. 1) is reversed in picture signal reversion circuit 40 during times t7 to t9. However, when average brightness level signal a decreases under 10 IRE, first comparator C1 outputs "H" level comparison output so that first inverter NOT1 applies "L" level signal h to inverted clear terminal CL of fifth D-FF D5. Accordingly, fifth D-FF D5 is cleared by "L" level signal h and its output f is forcibly changed to "L" level. The picture signal reversion in picture signal reversion circuit 40 is then inhibited after time t9.

As described above, in the embodiment, the average brightness level of picture signals is detected by integration circuit 73. And which range of level ranges I, II and III in FIG. 4 the average brightness level belongs to is detected by comparators C1 to C6. The proper control is made for the picture signal reversion in accordance to level ranges I, II and III.

A time required for selecting level ranges I, II and III depends on the time constant of integration circuit 73. In the embodiment, the time constant of integration circuit 73 and the cycle of second clock signal d for resetting RS-FFs FF1 and FF2 are set to substantially one field interval of video signals, respectively. So that flicker is reduced at every field unit. However, it is not always necessary to equalize the time constant of integration circuit 73 and the cycle of second clock signal d. In addition, the time constant of integration circuit 73 and the cycle of second clock signal d may be set to several fields. That is, the time constant of integration circuit 73 and the cycle of second clock signal d can be optionally set in the scrambling encoder in the TV station, in accordance to the stability of the reference level for perfoming the picture signal reversion. When subscriber's terminals are inferior to the stability of the reference level and also in DC reproduction level, it is preferable to set second clock signal d longer in the scrambling encoder in the TV station.

In the above embodiment, the reference level for the picture signal reversion is set to approximately 50 IRE and the picture signals with the average brightness level over a predetermined level is forcibly reversed. Therefore, when the picture signal scrambling system is used with the horizontal sync signal offset scrambling system, which offsets the horizontal sync signal to 50 IRE, the reversed picture signal can operate as the counterfeit horizontal sync signal in place of the genuine horizontal sync signal offset. Thus, the present invention used with the horizontal sync signal offset scrambling system increases the secrecy of scrambled programs, and makes decoding by non-subscribers more difficult.

In the embodiment described above, the flicker is reduced for each field unit. However, it is possible to reduce the flicker for each horizontal scan interval unit by setting the time constant of integration circuit 73 and the cycle of second clock signal d for resetting RS-FFs FF1 and FF2 to one or several horizontal scan intervals, respectively. Further, when setting the cycle of second clock signal d to a given number of the horizontal scan intervals, flicker for each divided field unit corresponding to the given number of the horizontal scan intervals is suppressed. These modifications also can be used with the horizontal sync signal scrambling offset system for increasing the secrecy of scrambled programs.

Figure 5:
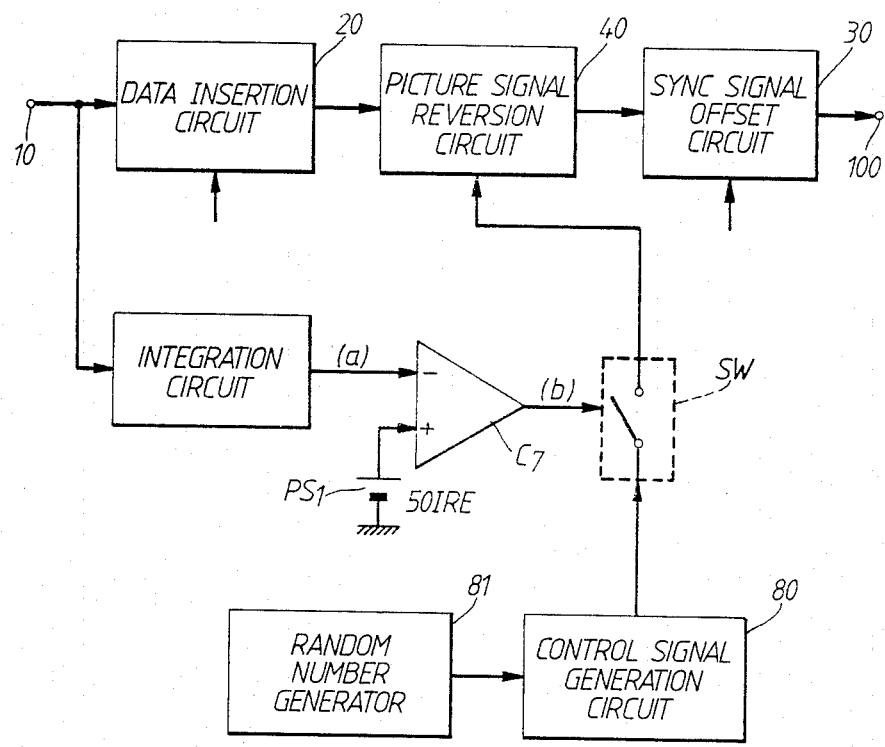
FIG. 5 is a block diagram showing another embodiment of the picture level reversion control circuit of FIG. 1.

Referring now to FIG. 5, another embodiment of the picture signal reversion control circuit will be described hereafter. In FIG. 5, integration circuit 73 is connected to input terminal 10 for producing average brightness level signal a. Average brightness level signal a is applied to an inverted input terminal of comparator C7. Comparator C7 corresponds to sixth comparator C6 in the embodiment of FIG. 3. While the non-inverted input terminal of comparator C7 is connected to a potential source PS1, which supplies a potential corresponding to 50 IRE. Then, average brightness level signal a is compared with the reference potential of 50 IRE in comparator C7. Comparison output b from comparator C7 is applied to a control terminal of switch SW. The control terminal of switch SW corresponds to inverted preset terminal PR of fifth D-FF D5 in the embodiment of FIG. 3. Switch SW is connected between a control signal generating circuit 80 and picture signal reversion circuit 40. Control signal generating circuit 80 is connected to a random number generator 81 for receiving a random number therfrom. So that control signal generating circuit 80 applies a control signal, which generates in timings according to the random number, to picture signal reversion circuit 40.

In the above embodiment shown in FIG. 5, it is detected that whether or not the average brightness level of the picture signal is higher than the reference potential 50 IRE, in comparator C7. When the average brightness level of the picture signal exceeds the reference potential 50 IRE, comparison output b of comparator C7 forcibly deactivates switch SW so that the application of the control signal from control signal generating circuit 80 to picture signal reversion circuit 40 is inhibited. Then, the picture signal reversion in picture signal reversion circuit 40 is forcibly stopped.

In addition, sixth comparator C6 in the embodiment of FIG. 3 may be set to compare average brightness level signal a with the reference potential of 50 IRE, in similar to the embodiment shown in FIG. 4. In this case, the reference potentials for other comparators C2 to C5 or the number of comparators (if necessary) are suitably changed.

According to the embodiment in FIG. 4, the carrier wave for transmitting the video signal to subscriber's terminals is prevented from being excessively modulated by the reversed picture signals. So that, the cross modulation distortion to the other channel is effectively improved.

As described above, the present invention can provide a video signal scrambling system, in which flicker on pictures presented at subscriber's terminals is reduced and the secrecy of scrambled programs against non-subscribers is increased.

Also, the present invention can provide a video picture signal scrambling system, which can reduce the flicker at either of the field unit and the horizontal scan interval unit.

In the embodiment, output c of level change detection circuit 75 may be applied directly to clock terminal CK of fifth D-FF D5 without passing through RS-FFs FF1 and FF2. In this case, output c of level change detection circuit 75 is applied as an information of the average brightness level change to clock terminal CK of fifth D-FF D5. Then, the picture signal is reversed by directly responding to the change of the brightness of the picture signal. That is, for improving the response characteristics for the brightness change, output c of level change detection circuit 75 may be better applied to fifth D-FF D5 without passing through RS-FFs FF1 and FF2. Also, for controlling the response characteristics of the brightness change, the cycle of the clock signal for first and second RS-FFs FF1 and FF2 may be suitably varied.

Further, the control of picture signal reversion can be performed by detecting an instantaneous brightness level of the picture signal in place of the average brightness level. In this case, the response characteristics of the level change can be controlled by suitably setting the frequency of clock signal d for RS-FFs FF1 and FF2.

What is claimed is:

1. A video signal scrambling system comprising:
   detecting means for detecting a brightness level of the picture signal over a predetermined interval;
   means coupled to the detecting means for comparing the brightness level with a first predetermined reference value;
   means for generating a control signal; and
   scrambling means responsive to the comparing means for inhibiting reversion of the picture signal when the brightness level of the picture signal exceeds the first reference value, and for selectively reversing the picture signal in response to the control signal; and
   low level means for comparing the brightness level with a second predetermined reference value lower than the first predetermined reference value and for forcibly reversing the picture signal when the brightness level is less than a second reference value.

2. The system of claim 1, wherein the scrambling means includes means for detecting the change of the brightness level between successive picture signals, and the control signal generating means generates the control signal according to the change of the brightness level.

3. The system of claim 2, wherein the level change detecting means detects the change of the brightness level greater than a predetermined amount.

4. The system of claim 3, wherein the scrambling means further includes means responsive to the control signal for reversing the picture signal and first switch means responsive to the comparing means for forcibly inhibiting the reversion of picture signal in the picture signal reversing means.

5. The system of claim 1, wherein the scrambling means further includes means responsive to the control signal for reversing the picture signal and first switch means responsive to the comparing means for forcibly inhibiting the reversion of picture signal in the picture signal reversing means.

6. The system of claim 5, wherein the scrambling means further includes second switch means responsive to the low level comparing means for forcibly causing the reversion of the picture signal in the picture signal reversing means.

7. The system of claim 1, wherein the scrambling means includes means for randomly generating a strain of numbers, and the control signal generating means generates the control signal according to the random number.

8. The system of claim 7, wherein the scrambling means also includes low level means for comparing the brightness level with a second predetermined reference value lower than the first predetermined reference value and for forcibly reversing the picture signal when the brightness level is less than the second reference value.

9. The system of claim 7, wherein the scrambling means further includes means responsive to the control signal for reversing the picture signal and first switch means responsive to the comparing means for forcibly inhibiting the reversion of picture signal in the picture signal reversing means.

10. The system of claim 8, wherein the scrambling means further includes means responsive to the control signal for reversing the picture signal and first switch means responsive to the comparing means for forcibly inhibiting the reversion of picture signal in the picture signal reversing means.

11. The system of claim 10, wherein the scrambling means further includes second switch means responsive to the low level comparing means for forcibly causing the reversion of the picture signal in the picture signal reversing means.

12. The system of claim 1, wherein the level change detecting means includes intermediate level means for comparing the brightness level with a third predetermined reference value between the first and the second predetermined reference values, means for storing an output of the level comparing means and means for taking an exclusive-OR between a previous output and a successive output of the intermediate level comparing means, the exclusive-OR taking means being connected to the intermediate level comparing means and the storing means.

13. The system of claim 12, wherein the level change detecting means includes a plurality of the intermediate level comparing means, a plurality of the storing means and a plurality of the exclusive-OR taking means and means for taking an inverted OR of the outputs of the plurality of the exclusive-OR taking means, and wherein the plurality of the intermediate level comparing means are associated to different reference values between the first and second predetermined reference values.

14. The system of claim 12, wherein the level change detecting means further includes means for latching the output of the exclusive-OR taking means, the latching means being clocked by a first predetermined clock signal.

15. The system of claim 14, wherein the first predetermined clock signal is a vertical sync signal of the video picture signal.

16. The system of claim 14, wherein the latching means comprementarily latches the output of the exclusive-OR taking means.

17. The system of claim 15, wherein the latching means is a reset-set type flip-flop, the set terminal and the reset terminal being connected for receiving the output of the exclusive-OR and the vertical sync signal, respectively.

18. The system of claim 15, wherein the latching means includes a pair of reset-set type flip-flops, the set terminals of the pair of reset-set type flip-flops being connected for receiving the output of the exclusive-OR and the reset terminals of the reset-set type flip-flops being connected for receiving the inverted and the non-inverted the vertical sync signals, respectively, and an AND gate for taking the AND logic of the inverted outputs of the pair of reset-set type flip-flops.

19. The system of claim 12, wherein the storing means is a D-type flip-flop and the exclusive-OR taking means is an exclusive-OR gate.

20. The system of claim 19, wherein the D-type flip-flop is clocked by a second clock signal.

21. The system of claim 20, wherein the second clock signal is a horizontal sync signal of the video picture signal.

22. The system of claim 13, wherein each of the plurality of the storing means is a D-type flip-flop and each of the plurality of the exclusive-OR taking means is an exclusive-OR gate and the inverted OR taking means is an NOR gate.

23. The system of claim 22, wherein each of the plurality of the D-type flip-flops are clocked by a second clock signal.

24. The system of claim 23, wherein the second clock signal is a horizontal sync signal of the video picture signal.

25. A video signal scrambling system comprising:
detecting means for detecting an average brightness level of the picture signal over a predetermined interval;
means coupled to the detecting means for comparing the average brightness level with a first predetermined reference value;
means for generating a control signal; and
scrambling means responsive to the comparing means for inhibiting reversion of the picture signal when the average brightness level of the picture signal exceeds the first reference value, and for selectively reversing the picture signal in response to the control signal; and
low level means for comparing the average brightness level with a second predetermined reference value lower than the first predetermined reference value and for forcibly reversing the picture signal when the average brightness level is less than a second reference value.

26. The system of claim 25, wherein the level detecting means is an integration circuit for detecting the average brightness level by integrating the picture signal.

27. The system of claim 26, wherein the scrambling means includes means for detecting the change of the average brightness level between successive picture signals, and the control signal generating means generates the control signal according to the change of the average brightness level.

28. The system of claim 27, wherein the level change detecting means detects the change of the average brightness level greater than a predetermined amount.

29. The system of claim 28, wherein the scrambling means further includes means responsive to the control signal for reversing the picture signal and first switch means responsive to the comparing means for forcibly inhibiting the reversion of picture signal in the picture signal reversing means.

30. The system of claim 25, wherein the scrambling means further includes means responsive to the control signal for reversing the picture signal and first switch means responsive to the comparing means for forcibly inhibiting the reversion of picture signal in the picture signal reversing means.

31. The system of claim 30, wherein the scrambling means further includes second switch means responsive to the low level comparing means for forcibly causing the reversion of the picture signal in the picture signal reversing means.

32. The system of claim 25, wherein the scrambling means includes means for randomly generating a strain of numbers, and the control signal generating means generates the control signal according to the random number.

33. The system of claim 32, wherein the scrambling means also includes low level means for comparing the brightness level with a second predetermined reference value lower than the first predetermined reference value and for forcibly reversing the picture signal when the brightness level is less than the second reference value.

34. The system of claim 33, wherein the scrambling means further includes means responsive to the control signal for reversing the picture signal and first switch means responsive to the comparing means for forcibly inhibiting the reversion of picture signal in the picture signal reversing means.

35. The system of claim 33, wherein the scrambling means further includes means responsive to the control signal for reversing the picture signal and first switch means responsive to the comparing means for forcibly inhibiting the reversion of picture signal in the picture signal reversing means.

36. The system of claim 34, wherein the scrambling means further includes second switch means responsive to the low level comparing means for forcibly causing the reversion of the picture signal in the picture signal reversing means.

37. The system of claim 28 wherein the level change detecting means includes intermediate level means for comparing the average brightness level with a third predetermined reference value between the first and the second predetermined reference values, means for storing an output of the level comparing means and means for taking an exclusive-OR between a previous output and a succesive output of the intermediate level comparing means, the exclusive-OR taking means being connected to the intermediate level comparing means and the storing means.

38. The system of claim 37, wherein the level change detecting means includes a plurality of the intermediate level comparing means, a plurality of the storing means and a plurality of the exclusive-OR taking means and means for taking an inverted OR of the outputs of the plurality of the exclusive-OR taking means, and wherein the plurality of the intermediate level comparing means are associated to different reference values between the first and second predetermined reference values.

39. The system of claim 37, wherein the level change detecting means further includes means for latching the output of the exclusive-OR taking means, the latching means being clocked by a first predetermined clock signal.

40. The system of claim 39, wherein the first predetermined clock signal is a vertical sync signal of the video picture signal.

41. The system of claim 39, wherein the latching means comprementarily latches the output of the exclusive-OR taking means.

42. The system of claim 40, wherein the latching means is a reset-set type flip-flop, the set terminal and the reset terminal being connected for receiving the output of the exclusive-OR and the vertical sync signal, respectively.

43. The system of claim 40, wherein the latching means includes a pair of reset-set type flip-flops, the set terminals of the pair of reset-set type flip-flops being connected for receiving the output of the exclusive-OR and the reset terminals of the reset-set type flip-flops being connected for receiving the inverted and the non-inverted the vertical sync signals, respectively, and an AND gate for taking the AND logic of the inverted outputs of the pair of reset-set type flip-flops.

44. The system of claim 37, wherein the storing means is a D-type flip-flop and the exclusive-OR taking means is an exclusive-OR gate.

45. A method for scrambling a video signal comprising the steps of:
- detecting a brightness level of the picture signal over a predetermined interval;
- comparing the detected brightness level with a first predetermined reference value;
- alternatively inhibiting reversion of the picture signal or selectively reversing the picture signal in response to changes in the brightness level in successive intervals of the picture signal according to the comparison with the first reference value; and
- comparing the average brightness level with a second predetermined value; and
- forcibly reversing the picture signal when the average brightness level is less than the second predetermined value.

46. A method for scrambling a video picture signal comprising the steps of:
- detecting an average brightness level of the picture signal over a predetermined interval;
- comparing the detected average brightness level with a first predetermined reference value;
- alternatively inhibiting reversion of the picture signal or selectively reversing the picture signal in response to changes in the average brightness level in successive intervals of the picture signal according to the comparison with the first reference value; and
- comparing the average brightness level with a second predetermined value; and
- forcibly reversing the picture signal when the average brightness level is less than the second predetermined value.

* * * * *